United States Patent [19]

Gauer

[11] Patent Number: 4,704,796

[45] Date of Patent: Nov. 10, 1987

[54] FRAMER

[76] Inventor: Glenn G. Gauer, 2414 NE. 46th, Portland, Oreg. 97213

[21] Appl. No.: 862,130

[22] Filed: May 12, 1986

[51] Int. Cl.⁴ .............................................. G01B 3/00
[52] U.S. Cl. .................. 33/1 B; 33/DIG. 9; 355/40; 355/74
[58] Field of Search ............ 33/1 B, DIG. 9; 355/40, 355/74

[56] References Cited

U.S. PATENT DOCUMENTS

| | | | |
|---|---|---|---|
| 855,121 | 5/1907 | McCormick | 33/DIG. 9 |
| 1,038,771 | 9/1912 | Loving | 355/40 |
| 1,096,345 | 5/1914 | Banfill | 355/40 |
| 1,679,927 | 8/1928 | Bell et al. | 33/DIG. 9 |
| 1,976,278 | 10/1934 | Cook | 33/DIG. 9 |
| 2,246,920 | 6/1941 | Kromhocz | 33/DIG. 9 |
| 2,342,525 | 2/1944 | Berry | 355/40 |
| 2,534,961 | 12/1950 | Dunn | 33/DIG. 9 |
| 2,560,937 | 7/1951 | Ens | 33/DIG. 9 |
| 2,702,944 | 3/1955 | Lane et al. | 33/1 B |
| 2,782,513 | 2/1957 | Brandt | 33/DIG. 9 |
| 3,089,384 | 5/1963 | Baasner | 355/74 |
| 3,203,334 | 8/1965 | Wilson et al. | 355/74 |
| 3,620,624 | 9/1969 | Van Acker | 355/74 |
| 4,171,573 | 10/1979 | Picciotto | 33/1 B |
| 4,325,630 | 4/1982 | Kimura et al. | 355/74 |
| 4,417,399 | 11/1983 | Baliozian | 33/DIG. 9 |
| 4,441,807 | 4/1984 | Bartz | 355/40 |
| 4,460,271 | 7/1984 | Lymperis | 355/74 |
| 4,482,924 | 11/1984 | Brownstein | 355/40 |

Primary Examiner—Willis Little
Attorney, Agent, or Firm—Klarquist, Sparkman, Campbell, Leigh & Whinston

[57] ABSTRACT

A framer for selecting and defining the position of a portion of a visual work. It may include a frame defining an aperture which may be moved relative to the work to place the aperture over the selected portion of the work and communication indicia for denoting the position of the frame relative to selected boundaries of the work.

33 Claims, 16 Drawing Figures

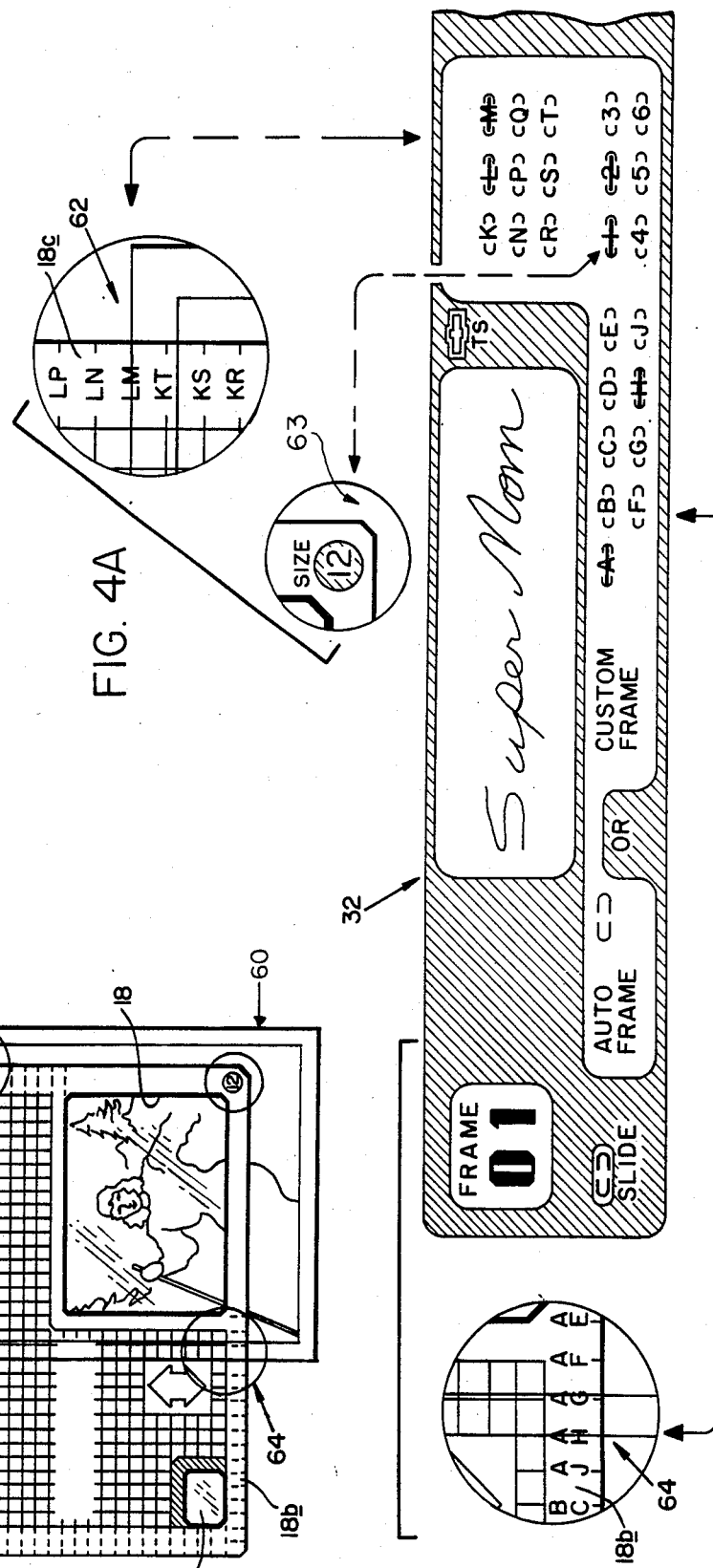
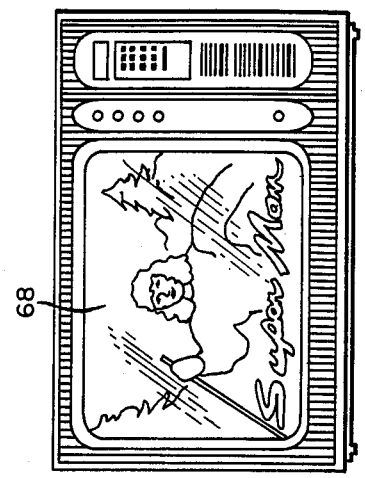
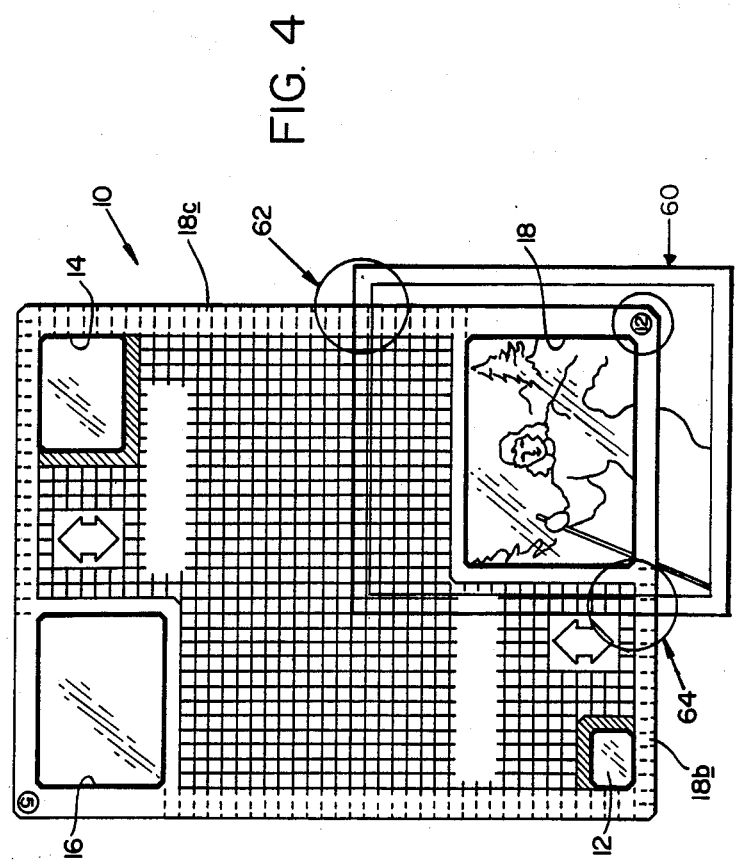
FIG. 5
FIG. 4A
FIG. 4

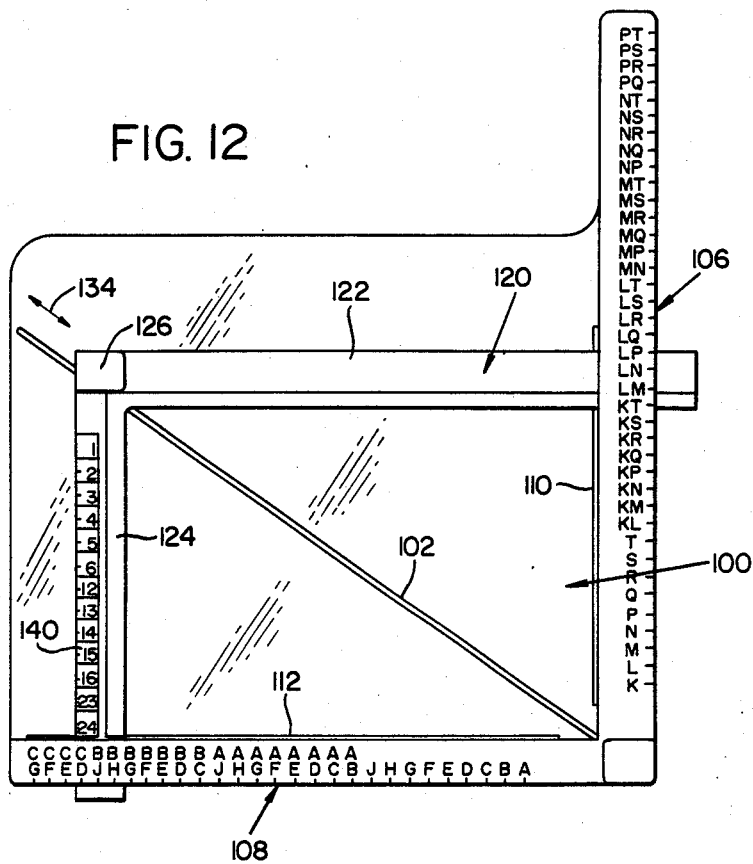
FIG. 12
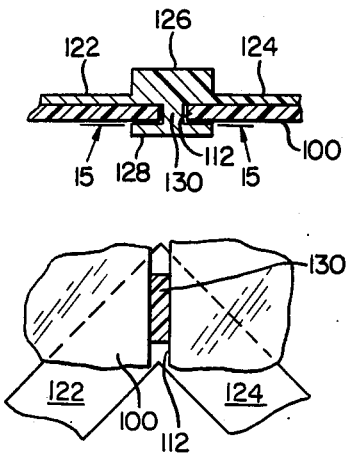
FIG. 14
FIG. 15
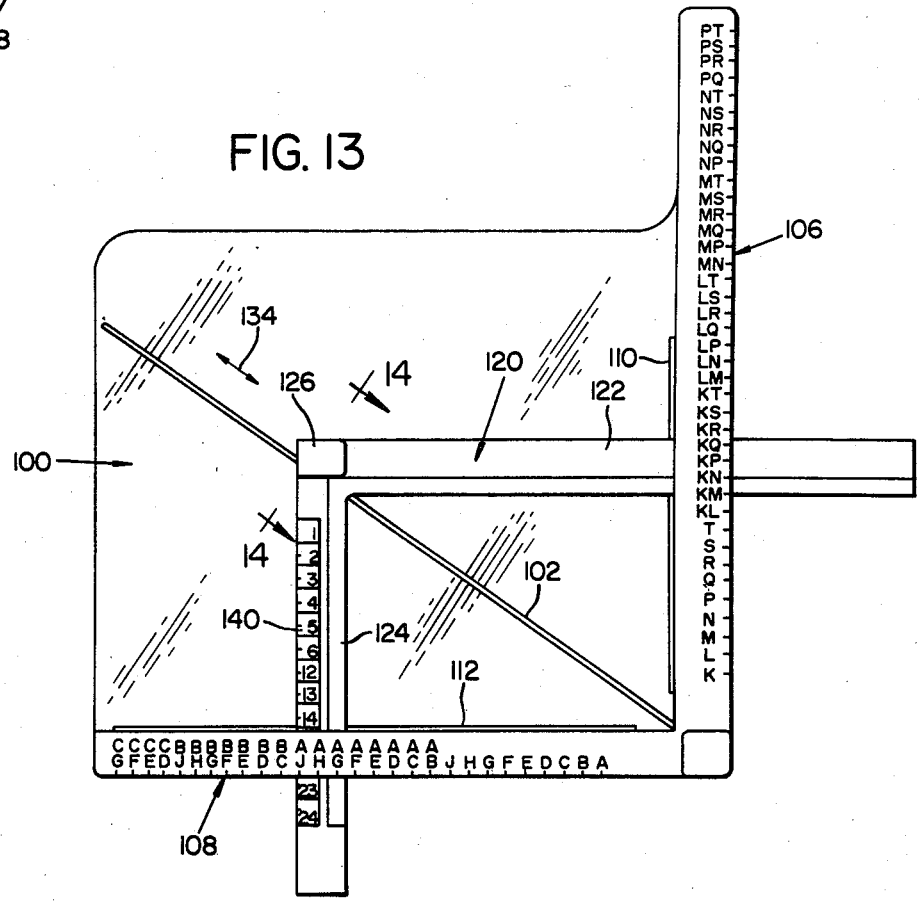
FIG. 13

FRAMER

BACKGROUND AND SUMMARY OF THE INVENTION

This invention relates to a system for selecting and defining the position of a portion of a visual work.

When working with visual media, such as photographs, artwork, graphs, etc., often it is desirable to be able to select a portion, or portions, of such work, in some way denote and define precisely the locations of the selected portions on the overall work, and record and/or communicate such, either for one's own use or for another. An example of where this would be advantageous is where one has a large photograph and wishes to select only a portion thereof for use in a final work. Also it can be used to define the relative positions of multiple portions on a single work.

An object of the present invention is to provide a novel and simple apparatus which accomplishes this task in a precise manner.

A more specific object of the present invention is to provide a novel framer for selecting and defining the position of a portion of a visual work whereby such position may be communicated for subsequently relocating the selected portion in a very precise manner.

More specifically, an object of the present invention is to provide a framer which comprises an overlay having a visual aperture of a preselected size and proportion capable of being placed over the visual work and moved relative thereto to place the aperture over a selected portion of the work, and communication, or notation, indicia positioned on the overlay for denoting the position of the overlay and its included aperture relative to the selected boundaries, or reference portions, of the work.

Yet another object of the invention is to provide a novel system for defining and communicating the position of a selected portion of a visual work, which system includes an overlay framer with a visual aperture of a preselected size and proportion which may be placed over a selected portion of the work, communication indicia on the framer for denoting the position of the aperture relative to the work, and recording means for recording the indicia and communicating the same to permit subsequent precise location of the selected portion of the work at a later time.

A still further object is to provide a novel framer in which an aperture is variable in size, yet which retains a consistent proportionality throughout its intended range of size variability.

DRAWINGS

These and other objects and advantages will become more fully apparent as the following description is read in conjunction with the drawings wherein:

FIGS. 4, 4a and 5 illustrate a use of and a product resulting from use of a system shown in the prior figures;

FIGS. 6-14 illustrate further uses and results of use of a system as set out in FIGS. 1-3;

FIGS. 12 and 13 illustrate a modified embodiment of the invention;

FIG. 14 is an enlarged cross-sectional view taken along line 14—14 in FIG. 13; and FIG. 15 is a view taken along line 15—15 in FIG. 14.

DESCRIPTION OF PREFERRED EMBODIMENTS OF THE INVENTION

Preferred embodiments of the invention will be described herein as examples of selecting portions of still photographs for incorporating into a video display production. Due to the generally defined height-to-width proportionality of a video screen, the proportions of the selected parts of the works discussed herein are illustrated and described in height-to-width ratios corresponding to those found on a video display screen.

It should be recognized, however, that this invention has applications far beyond that described herein, and is adapted for use in selecting and denoting the location of selected portions of a variety of visual media.

Figure 2:
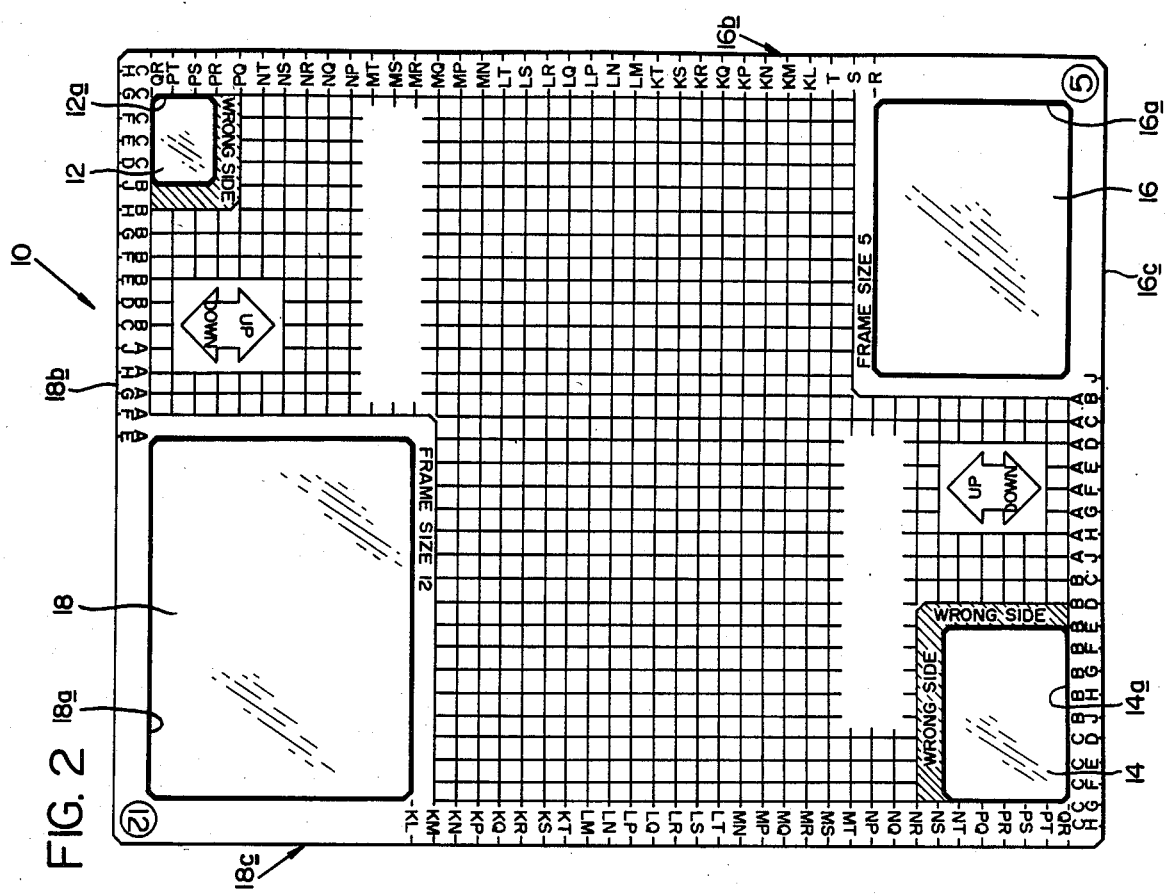
FIG. 2 is a view of the opposite face of the overlay of FIG. 1.
Figure 1:
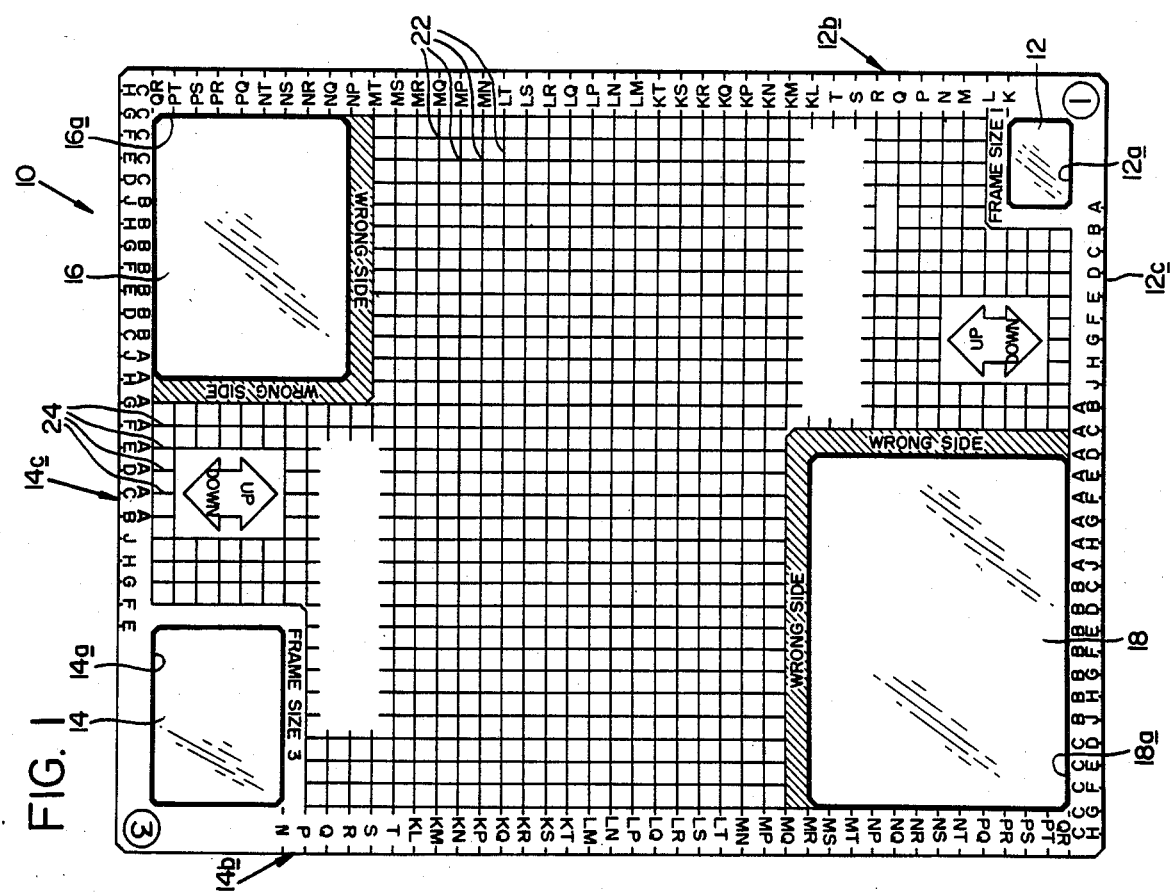
FIG. 1 is a view of one face of a form of overlay comprising a portion of an embodiment of the invention.

Referring first to FIGS. 1 and 2, these illustrate opposite sides of a transparent unitary framing overlay sheet 10. The sheet includes four transparent visual apertures 12, 14, 16 and 18 defined by borders 12a, 14a, 16a, and 18a.

Adjacent the boundaries of each of these apertures is a notation as to the frame size number on one side of the sheet, and on the other side of the sheet is a notation, "Wrong Side.38 These are to indicate to the user which side of the sheet should be facing up (toward the user) during use. The user should be able to see the frame size number when in use.

Each of the apertures is of a different size and is proportioned in the same height-to-width ratio as a common video display screen for this example.

Remainder portions of transparent sheet 10 intermediate apertures 12, 14, 16 and 18 are imprinted with a plurality of perpendicularly disposed horizontal and vertical gridlines 22, 24, respectively.

Arrayed around the border of sheet 10 are a series of letters in ascending order, each of which is adjacent the end of one of the gridlines. These are referred to herein as communication, or notation, indicia. Each aperture has its own discrete set of such notations. For example, aperture 12 has indicia 12b, 12c associated therewith, and apertures 14, 16, 18 have indicia 14b, 14c, 16b, 16c and 18b, 18c, respectively. Although alphabetic indicia are illustrated, it should be recognized that numeric, or another symbolic type of communicating indicia by which information can be transmitted, may be used also.

In FIG. 2, and referring to aperture 18 (frame size 12), it will be noted that adjacent the aperture are alphabetic indicia AE–CH extending along the horizontal axis, and alphabetic notations KL–QR extending along the vertical axis.

Figure 3:
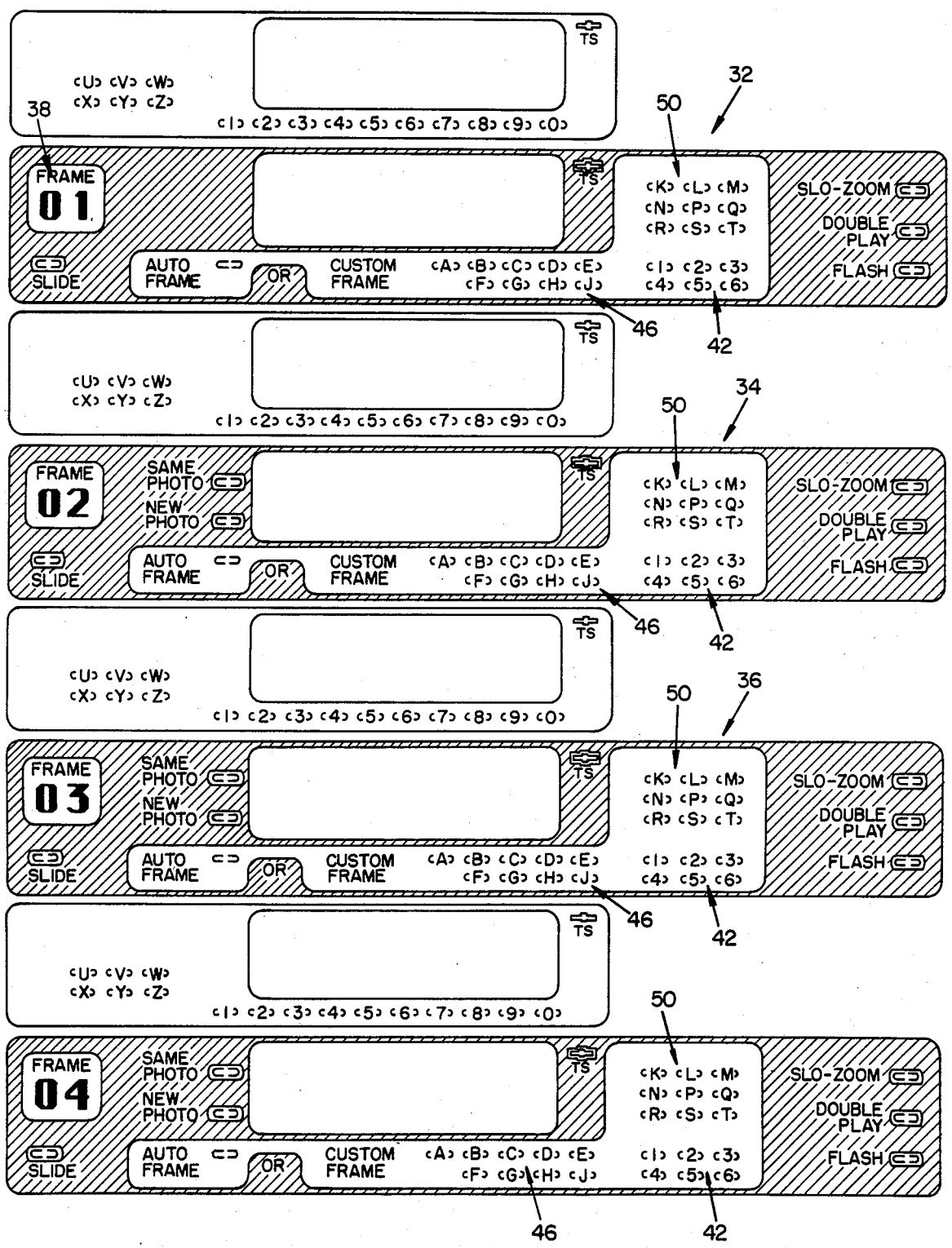
FIG. 3 illustrates a series of recording means used to record and communicate information determined by use of the framer of FIGS. 1 and 2.

Referring to FIG. 3, a plurality of recording, or communicating, means 32, 34, 36 are illustrated. These include elongate cards, or slips, having boxes defined thereon into which information can be entered. In the upper left-hand corner of card 32 is a picture frame notation 38 to denote the picture with which the recording card is to be used. In the central region of the card are numerals 1-6 in markable boxes at 42. These correspond to the frame size notations, such as previously described for apertures 12, 14, 16 and 18; (i.e. aperture 16 is frame size 5).

To the left of numerals 42 are alphabetic notations A–J in boxes 46. Above the numeral designations 42 are alphabetic notations K–T in boxes 50.

The boxes in which each of the numerals, or alphabetic letters, is confined may be manually marked for communicating information regarding the selected frame, as will be described below.

Describing a method of operation using the apparatus, reference is made to FIGS. 4 and 5. A user may have a photograph such as noted at 60, here a photo of a skier in mountainous terrain. However, the user may wish to use only a small portion of this overall photograph. The present invention allows the user to select a specific portion of the photograph, denote the precise location of the selected portion, and to record and/or communicate that information.

Referring to FIG. 4, the user places overlay sheet 10 on, or in front of, the photograph. The amount of photograph 60 to be used is determined by which of apertures 12, 14, 16, 18 are positioned over the selected portion of the photograph, recognizing that the apertures vary in size. In this illustration, aperture 18 (frame size 12) is used. When the user has positioned the aperture to set off the desired section of the photograph, the location is easily determined by noting at 62, 64 the position of the border or other selected reference on the photo relative to the alphabetic notations along the borders of overlay sheet 10. The aperture size is also noted at 63.

The user merely reads the alphabetic notations on the horizontal and vertical borders as illustrated and then records the same on the recording card to be associated with that photo. In this instance, it will be noted that on card 32 in FIG. 4 the frame size has been marked as 1–2 (to denote frame size 12), the lower, horizontal, border notation is marked as AH, and the right side, vertical, alphabetic notation is at LM, conforming to the locations denoted by indicia 18b, 18c.

By using a manually marked communicating and recording medium as noted here, the information as to the size and position of the selected portion of the photograph can be transmitted easily and precisely for further use. For example, the card may be machine readable by an optical scanner to control a computer-operated animation camera. This can precisely locate the selected portion of the photograph to place it on video tape for projection on a video screen picture 68 as illustrated in FIG. 5.

Explaining further, a user can easily take a photograph as illustrated at 60, and with the use of an aperture in the transparent overlay sheet select a portion of the photograph to be used. The position of the selected portion is noted by the notation indicia at the edges of the overlay sheet. This can be recorded and communicated easily by use of the recording cards described. This information then can be used subsequently by others to relocate that exact portion of the photograph.

In the example set out above the user has selected the portion of photo 60 which shows only the upper portion of the skier. The precise location of this portion of the photo has been communicated by the border notation indicia. With this information the same user, or another, can precisely relocate the selected portion to capture it on video tape, or in another format if desired. In FIG. 5 the selected portion has been put on video tape and is shown in replay.

FIGS. 6–11 illustrate additional uses of this system.

Figure 6:
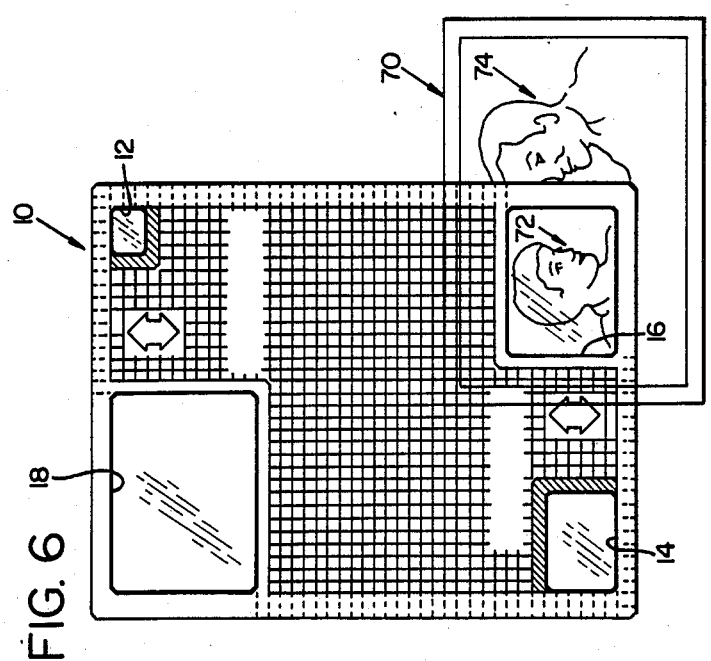
Figure 7:
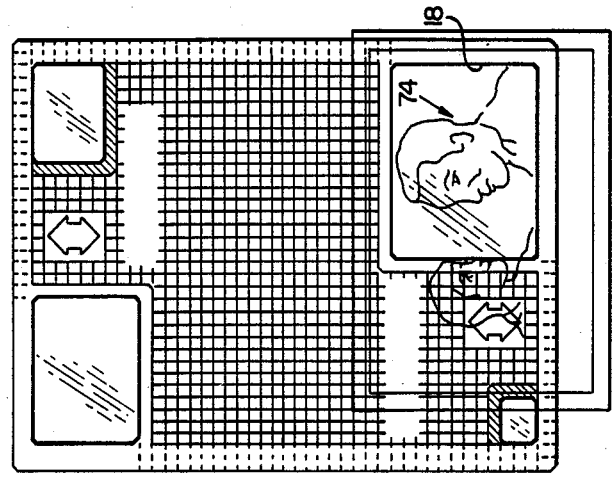

In FIG. 6, a photograph 70 including two subjects 72, 74 is shown.

Figure 9:
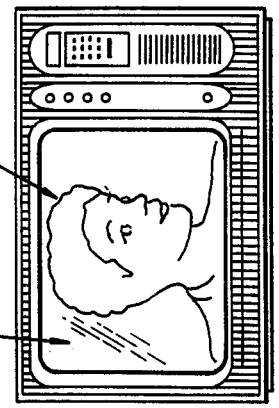

In FIG. 6, sheet 10 is illustrated in position overlaying photo 70 with aperture 16 positioned over subject 72. In this manner the user can select only a portion of one subject in the photograph. By noting the horizontal and vertical alphabetic notations along the border, as previously described, this information can be communicated to a subsequent user to obtain the segregated image on videotape as illustrated in FIG. 9 on video screen 75.

Figure 10:
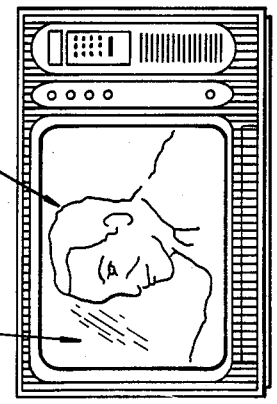

Similarly, by moving overlay sheet 10 to a position where aperture 18 overlies subject 74 and noting the position of the overall work in relation to the boundary notations, a subsequent user can segregate subject 74 as illustrated in the video image at FIG. 10. The notations developed in the FIG. 6 and FIG. 7 applications also serve to denote the relative positions of selected portions on a single work. For example, this information on relative positions of multiple selected portions within the single work could be used to develop a path for a camera to follow in scanning from the image in FIG. 9 to the image in FIG. 10.

Figure 8:
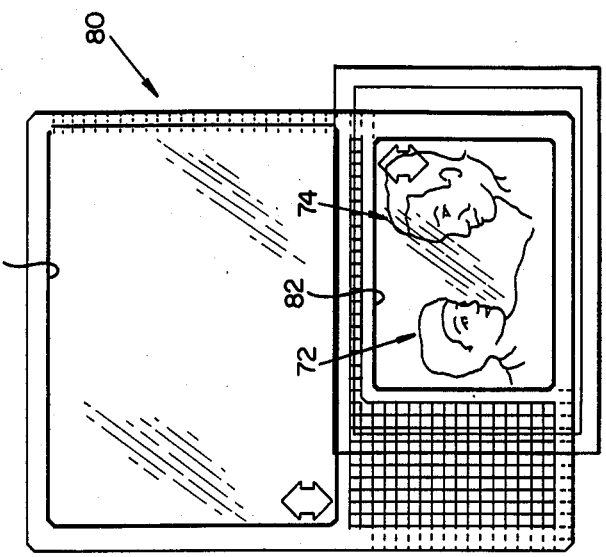
Figure 11:
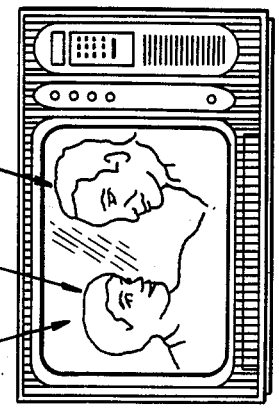

FIG. 8 illustrates use of another overlay sheet 80 with larger transparent apertures 82, 84. This includes a gridwork pattern imprinted thereon and alphabetic notations along its borders for use with these larger apertures. Apertures 82, 84 are of such size as to accommodate both subjects 72, 74 with information being able to be communicated to produce a visual image as illustrated in FIG. 11.

Thus, it will be seen that by use of this apparatus and method a user can precisely select and locate a portion of a visual work and record or communicate the same for subsequent use.

FIGS. 12 and 13 illustrate another embodiment of the invention. In this instance the aperture size is variable, while the height-to-width proportionality of the aperture is maintained in a preselected ratio, or proportionality, throughout variability in size of the aperture.

Explaining in greater detail, a substantially transparent overlay sheet 100 is provided, having an essentially straight-line slot 102 formed therein.

Arrayed along regions disposed substantially perpendicularly to each other and along the borders of sheet 100 are boundary, or border, symbolic indicia 106, 108 similar to that previously described along the borders of aperture sheet 10.

A pair of elongate slits 110, 112 extend through portions of the overlay sheet 100 adjacent to boundary notations 106, 108 respectively.

A second, or L-shaped, member, or element, 120 is mounted on overlay 100. Element 120 has perpendicularly disposed legs 122, 124. As is seen, these extend through slits 110, 112.

At the vertex between legs 122, 124 is means to aid in mounting element 120 on sheet 100 while allowing movement there between. This is better illustrated in FIG. 14 and 15. In FIG. 14, it will be seen that an enlarged portion 126 joins to and projects upwardly from the juncture of legs 122, 124. A holding portion 128 which is wider than slot 102 underlies marginal edge portions of slot 102 in sheet 100. An elongate neck portion 130 joins portions 126, 128 and fits slidably in slot 112.

This construction allows the L-shaped element 120 to be moved relative to sheet 100 along the direction of slot 102 as indicated by dual-headed arrow 134. Such movement of element 120 relative to element 100 varies the size of the aperture defined between slits 110, 112 and the inner edges of legs 122, 124 while maintaining a preselected height-to-width ratio, or proportionality.

Arrayed along leg 124 of element 120 are a series of numerical indicia which indicate the size of the aperture at any given position of element 120 relative to overlay sheet 100. For example, in FIG. 12 the aperture size would be noted as 24, whereas in FIG. 13 where the aperture size has been reduced, it would be an aperture size 14.

Use of the variable aperture size framer illustrated in FIGS. 12-15 is similar to that previously described for the prior embodiment of the invention.

As has been mentioned previously, this apparatus and method is useful, not only in the application described herein, but also a variety of other areas. Such could include, but need not be limited to, commercial art, business graphics, and any and all other areas in which one wishes to select and/or segregate a portion of a work, locate its position, and record or communicate these for subsequent use.

While preferred embodiments of the invention have been described herein, it should be apparent to those skilled in the art that variations and modifications are possible without departing from the spirit of the invention.

I claim:

1. A framer for selecting and defining the position of a portion of a visual work having fixed references such as borders comprising:
    an overlay having a visual aperture defined therein of a preselected size and proportion capable of being placed over such visual work and moved relative thereto to place said aperture over a selected portion of such work, said overlay further having a plurality of aperatures therein of different sizes with discrete series of communication indicia for each said aperature, and
    communication indicia positioned along at least two regions of said overlay and disposed at substantial angles relative to each other for denoting the position of said aperture relative to the fixed references on the work.

2. The framer of claim 1, wherein said overlay is a sheet and said visual aperture comprises a transparent void free portion of said sheet.

3. The framer of claim 1, wherein said indicia are positioned along axes disposed substantially normal to each other and along the boundaries of the overlay.

4. The framer of claim 3 in which the aperture is at a corner of the overlay.

5. The framer of claim 1, which further comprises aperture identifying indicia associated with each aperture for identifying the aperture selected for use.

6. The framer of claim 1 in which the communication indicia comprises first communication indicia positioned along a first axis and second communication indicia positioned along a second axis which is substantially normal to the first axis,
    the ratio of the spacing of the first indicia to the spacing of the second indicia being independent of the proportions of said visual apertures.

7. The framer of claim 1 in which the communication indicia comprises a first set of plural distinct communication indicia associated with and positioned along a first axis and a second set of plural distinct communication indicia associated with and positioned along a second axis, the second axis being substantially normal to the first axis, the indicia of the first set also being distinct from the indicia of the second set, whereby due to the distinctness of the indicia the individual indicia each communicate the axis with which they are associated and the position along the associated axis.

8. The framer of claim 1 in which the visual aperture is other than square and the communication indicia are spaced equally apart along said two regions of said overlay.

9. The framer of claim 1 in which the overlay is rectangular and the respective apertures are each positioned adjacent a respective corner of the overlay.

10. The system of claim 9 in which said recording means comprises plural manually markable data card sections, the communication indicia for each selected portion of one or more visual works being manually marked on a separate data card section.

11. The framer of claim 1 in which the overlay is a transparent sheet with at least two of said apertures, the indicia for a first of the apertures being on one side of the sheet and the indicia for the other aperture being on the other side of the sheet.

12. A framer for selecting and defining the position of a portion of a visual work comprising a transparent overlay sheet having imprinted thereon means bounding a visual aperture of selected size and proportion capable of being placed over such visual work and moved relative thereto to place said aperture over a selected portion of said work, a pattern of gridlines disposed at substantial angles to each other for alignment purposes, and communication indicia distinct from the gridlines and adjacent at least two borders of said sheet for denoting the position of said aperture and overlay relative to selected references on the work.

13. A framer for selecting and defining the position of a portion of a visual work comprising a transparent overlay sheet having imprinted thereon means bounding a visual aperture of selected proportion capable of being placed over such visual work and moved relative thereto to place said aperture over a selected portion of said work, a pattern of gridlines disposed at substantial angles to each other for alignment purposes, and communication indicia adjacent at least two borders of said sheet for denoting the position of said aperture and overlay relative to selected references on the work, said overlay including a plurality of visual apertures of different sizes imprinted thereon with discrete series of communication indicia for each said aperture.

14. A framer for selecting and defining the position of a portion of a visual work having fixed reference portions such as borders comprising:
    an element having a visual aperture defined therein of a preselected size and proportion capable of being placed in front of such work and moved relative to the work to place the aperture in front of a selected portion of the work, said element further having a plurality of aperatures of different sizes with discrete series of notation indicia associated with each aperature, and
    notation indicia positioned along at least two angularly disposed regions of said element for denoting the position of said aperture relative to the fixed reference portions of such work.

15. The framer of claim 14, wherein said element comprises a transparent overlay sheet in which the visual apertures comprise void free portions of the sheet and having imprinted thereon border means bounding said visual apertures.

16. A framer for selecting and defining the position of a portion of a visual work having fixed reference portions such as borders comprising:
- an overlay having a visual aperture defined therein of a preselected height-to-width proportionality capable of being placed over such visual work and moved relative thereto to place said aperture over a selected portion of such work, said indicia including two discrete spaced-apart sets of symbolic indicia positioned to overlay and denote the position of said aperature relative to angularly disposed boundaries of a work, and
- indicia positioned along two discrete regions of said overlay for denoting the position of said aperture relative to the fixed reference portions on the work.

17. A framer for selecting and defining the position of a portion of a visual work having fixed reference portions comprising:
- aperture means defining an expandable-contractible aperture, variable in size while maintaining a preselected height-to-width proportionality capable of being placed over such work and moved relative thereto over a selected portion of such work, said aperture means comprising a transparent overlay sheet element having a first angular boundary formed thereon to define one margin of the aperature and a second element having a second angular boundary formed thereon to define another margin of the aperature, the overlay sheet having a slot extending outwardly from the first boundary, mounting means mounting said second element on said overlay sheet element for shifting relative thereto along the slot, the slot being oriented to define a path of travel of the second element that maintains a preselected orientation of said first and second boundaries while allowing them to be moved toward and away from each other, and
- indicia positioned along two discrete regions of said means for denoting the position of the aperture relative to the fixed reference portions of the work.

18. The framer of claim 17, wherein said aperture means comprises two elements shiftable relative to each other along a preselected path to vary the size of the aperture defined therebetween while maintaining said proportionality.

19. The framer of claim 18, which further comprises frame size indicia for denoting the positions of said elements relative to each other and the size of aperture defined therebetween.

20. The framer of claim 18, which further comprises mounting means capable of maintaining a preselected orientation of said elements relative to each other while allowing them to be moved toward and away from each other to vary the size of the aperture defined therebetween.

21. A system for selecting, defining and communicating the position of a selected portion of a visual work having reference portions such as borders comprising;
- an overlay having a visual aperture defined therein capable of being placed over such visual work and moved relative thereto to place said aperture over a selected portion of such work, communication indicia positioned along at least two regions of said overlay disposed at substantial angles relative to each other for denoting the position of said aperture relative to the reference portions on the work, and
- recording means usable without being positioned between the visual work and overlay for recording said indicia and for communicating the recorded indicia separate from the visual work to permit subsequent precise location of said selected portion of said work from the recorded indicia.

22. The system of claim 21, wherein said overlay may be shifted to position said aperture over a second selected portion of said work, said communication indicia denote the position of said aperture relative to the reference portions on the work, and which further comprises second recording means usable without being positioned between the visual work and the overlay for recording said indicia and for communicating the recorded indicia separate from the visual work to permit subsequent precise location of said second selected portion of said work from the recorded indicia, which establishes the positions of the first mentioned and second portions relative to each other on said work.

23. The system of claim 21 in which said recording means comprises at least one manually markable data card upon which the communication indicia is manually marked.

24. A system for selecting, defining and communicating the position of a selected portion of a visual work comprising:
- an overlay having a visual aperture defined therein of preselected proportion capable of being placed over such visual work and moved relative thereto to place said aperture over a selected portion of such work, communication indicia positioned along at least two regions of said overlay disposed at substantial angles relative to each other for denoting the position of said aperture relative to selected references on the work,
- recording means for manually recording said indicia and communicating the same to permit subsequent precise location of said selected portion of said work, and
- said recording means comprising an element having portions which may be manually marked and which are capable of machine reading.

25. A system for selecting, defining and communicating the position of a selected portion of a visual work comprising:
- an overlay having a visual aperture defined therein of preselected proportion capable of being placed over such visual work and moved relative thereto to place said aperture over a selected portion of such work, communication indicia positioned along at least two regions of said overlay disposed at substantial angles relative to each other for denoting the position of said aperture relative to selected references on the work,
- recording means for manually recording said indicia and communicating the same to permit subsequent precise location of said selected portion of said work, and
- wherein said recording means comprises an element having portions thereon which may be manually marked for optical scanning to determine the noted indicia of the selected aperture position.

26. A method of selecting a defined portion of a visual work having fixed references such as borders and denoting the location of the selected portion in the overall work relative to the references comprising the steps of:

providing an overlay having a visual aperture defined therein and communication indicia positioned along two discrete regions of the overlay, positioning the overlay over the work with the margins of the aperture defining the boundaries of the selected portion of the work, noting from said communication indicia the position of the aperture in relation to the fixed references on the overall work, and recording such communication indicia notation for subsequent identification of the selected portion of such work.

27. The method of claim 26, which comprises the further steps of shifting said overlay to position the aperture over a second selected portion of the work, noting from said indicia the position of the aperture in relation to the fixed references on the work, and recording such indicia to establish the position of said first-mentioned and second portions relative to each other on said work.

28. The method of claim 26 in which the overlay also includes size indica for indicating the size of the visual aperture, the recording step also including the step of recording the size indicia.

29. The method of claim 26 in which the recording step comprises recording the communication indicia separate from the visual work to permit subsequent precise location of said selected portion of said work from the recorded indicia.

30. The method of claim 26 in which the overlay includes plural apertures and size indicia for identifying the respective apertures, the step of positioning the overlay over the work comprises the step of selecting one of the apertures and positioning the selected aperture over the work, the recording step also including the step of recording the size indicia which identifies the selected aperture.

31. The method of claim 30 comprising repeating the steps of claim 30 to provide a sequence of recorded communication and size indicia for selected portions of one or more visual works.

32. The method of claim 31 in which the recording step comprises manually recording the communication and size indicia on data cards.

33. The method of claim 26 comprising the step of recording such communication indicia for subsequent optical scanning.

* * * * *